(12) United States Patent
Cikanek et al.

(10) Patent No.: US 8,396,618 B2
(45) Date of Patent: Mar. 12, 2013

(54) SYSTEM AND METHOD FOR CONTROLLING DRIVETRAIN TORQUE AND HILL HOLDING OF A HYBRID VEHICLE

(75) Inventors: Susan Cikanek, Northville, MI (US); Suresh Sureshbabu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2216 days.

(21) Appl. No.: 10/906,883

(22) Filed: Mar. 10, 2005

(65) Prior Publication Data
US 2005/0143877 A1 Jun. 30, 2005

(51) Int. Cl.
| B60L 7/00 | (2006.01) |
| G05D 17/02 | (2006.01) |
| G06F 17/00 | (2006.01) |
| G06F 7/00 | (2006.01) |
| B60T 7/12 | (2006.01) |
| B60K 6/22 | (2007.10) |
| B60W 10/00 | (2006.01) |

(52) U.S. Cl. .......... 701/22; 701/70; 701/78; 180/65.21; 180/65.265; 303/152; 303/192

(58) Field of Classification Search ................ 701/1, 36, 701/70, 78, 79, 83, 87, 93–95, 22; 180/65.2, 180/65.4, 65.6, 65.7, 65.265, 65.71, 65.21; 303/20, 121, 152, 191–192; 475/5; 477/2, 477/3
See application file for complete search history.

(56) References Cited

U.S. PATENT DOCUMENTS

| 5,484,044 | A | 1/1996 | Bursteinas et al. |
| 6,009,984 | A | 1/2000 | Zechmann et al. |
| 6,059,064 | A * | 5/2000 | Nagano et al. ................ 180/243 |
| 6,086,515 | A * | 7/2000 | Buschmann et al. ......... 477/194 |
| 6,260,934 | B1 | 7/2001 | Lee |
| 6,315,373 | B1 * | 11/2001 | Yamada et al. ............... 303/191 |
| 6,321,144 | B1 * | 11/2001 | Crombez ........................ 701/22 |
| 6,527,076 | B1 * | 3/2003 | Polzin ........................... 180/170 |
| 6,549,840 | B1 * | 4/2003 | Mikami et al. .................. 701/69 |
| 6,589,134 | B2 * | 7/2003 | Williams et al. ................ 477/99 |
| 2003/0085576 | A1 * | 5/2003 | Kuang et al. ................ 290/40 C |
| 2003/0214186 | A1 * | 11/2003 | Kinder et al. ................. 303/192 |

* cited by examiner

*Primary Examiner* — Thomas Tarcza
*Assistant Examiner* — Edward Pipala
(74) *Attorney, Agent, or Firm* — David B. Kelley; Brooks Kushman P.C.

(57) ABSTRACT

A system and method for controlling torque in a hybrid electric vehicle. The system provides a regenerative braking torque with an electrical machine when a level of braking torque indicated by actuation of a brake control device exceeds a level of traction torque indicated by actuation of an acceleration control device. The regenerative braking torque is supplemented by a friction braking system when the braking torque requested by a vehicle operator exceeds a maximum regenerative braking capacity of the electrical machine.

20 Claims, 6 Drawing Sheets

SYSTEM AND METHOD FOR CONTROLLING DRIVETRAIN TORQUE AND HILL HOLDING OF A HYBRID VEHICLE

BACKGROUND OF THE INVENTION

1. Field of the Invention

The present invention relates generally to a system and a method of control for a motor vehicle, and more particularly to a system and method for controlling torque provided to one or more wheels of a hybrid vehicle.

2. Background Art

Vehicle operators prefer that hybrid vehicles behave similarly to conventional motor vehicles, such as those having an internal combustion engine and an automatic transmission. One desirable characteristic is "hill holding" capability, or a lack of rollback when a vehicle is disposed on an inclined surface. In a conventional vehicle, the vehicle power train delivers enough torque at idle to the vehicle traction wheels to hold the vehicle on an inclined surface. In a hybrid vehicle, the engine may be turned off and therefore may not be available to provide torque. Moreover, starting or continuing operation of the engine to provide hill-holding torque wastes fuel and increases undesirable emissions when sufficient torque may be available from other sources. In addition, the use of an electrical machine in a hybrid vehicle to provide hill holding torque may be undesirable since it wastes battery power and increases cooling requirements.

Before applicants' invention there was a need for a system and a method that inhibits rollback of a hybrid vehicle disposed on an inclined surface. In addition, there was a need for a system and a method that could inhibit vehicle rollback on an inclined surface having a steeper grade than was accommodated by previous systems. In addition, there was a need for a system and method that improves operating efficiency of a hybrid vehicle during hill holding situations. In addition there was a need for a system and a method that could implement hill holding without relying on an electrical machine to provide torque, thereby improving component life and reducing cooling requirements. Problems associated with the prior art as noted above and other problems are addressed by applicants' invention as summarized below.

SUMMARY OF THE INVENTION

According to one aspect of the present invention, a system for controlling torque in a hybrid electric vehicle is provided. The system includes the primary and secondary power sources, the power transfer unit, an electrical machine, an acceleration control device, and a brake control device. The power transfer unit is adapted to drive vehicle traction wheels. The electrical machine is selectively coupled to the power transfer unit and is adapted to provide traction torque to the traction wheels when powered by the primary or secondary power sources or impose a regenerative braking torque on the traction wheels. The acceleration control device provides a first signal indicative of traction torque requested by a vehicle operator. The brake control device provides a second signal indicative of braking torque requested by the vehicle operator. Regenerative braking torque may be provided by the electrical machine when engagement of a gear of the power transfer unit is requested by the vehicle operator, the speed of the hybrid electric vehicle is less than a creep speed value, and a level of braking torque indicated by the second signal exceeds a level of traction torque indicated by the first signal.

The hybrid electric vehicle may also include a friction braking system for inhibiting rotation of the traction wheels. The regenerative braking torque may be supplemented by the friction braking system when the braking torque requested by the vehicle operator exceeds a maximum regenerative braking capacity of the electrical machine.

The primary power source may be an internal combustion engine. The internal combustion engine may be turned off when engagement of a gear of the power transfer unit is requested, the speed of the hybrid electric vehicle is less than the creep speed value, and the accelerator and brake control devices are not actuated.

The friction braking system may be actuated to inhibit rollback of the hybrid electric vehicle when the vehicle operator requests engagement of a gear of the power transfer unit, the speed of the hybrid electric vehicle is less than the creep speed value, and the traction wheels are rotating in a first direction opposite from a direction associated with the gear requested by the vehicle operator.

According to another aspect of the present invention, a method of controlling torque in a hybrid electric vehicle drivetrain is provided. The drivetrain includes an engine and an electrical machine. The method includes the steps of determining whether a vehicle rollback condition exists, actuating a brake system to inhibit rollback if the vehicle rollback condition exists, determining a desired braking torque and a desired traction torque, and providing a regenerative braking torque with the electrical machine when the desired braking torque exceeds the desired traction torque.

The engine may be turned off if accelerator and brake control devices are not actuated.

The step of providing regenerative braking torque may also include turning off the engine if the brake control device is actuated and the acceleration control device is not actuated.

The hybrid electric vehicle may include a friction braking system. The regenerative braking torque may be supplemented with braking torque provided by the friction braking system when the desired braking torque exceeds a maximum regenerative braking capacity of the electrical machine.

According to another aspect of the present invention, a method of controlling torque in a drivetrain of a hybrid electric vehicle is provided. The method includes the steps of determining whether a gear is selected by an operator, determining whether the speed of the hybrid electric vehicle is less than a creep speed value when the gear is selected, determining whether a vehicle rollback condition exists, actuating a brake system to inhibit rollback if the vehicle rollback condition exists, determining a desired braking torque and a desired traction torque, and providing a braking torque with the electrical machine to capture energy when the desired braking torque exceeds the desired traction torque.

The desired braking torque may be based on actuation of a brake control device. The desired traction torque may be based on actuation of an acceleration control device.

Brake torque may be provided with a friction braking system when the desired braking torque exceeds a maximum regenerative braking capacity of the electrical machine. The maximum regenerative braking system may be based on a gear ratio of the electrical machine and an electrical machine engagement factor. The amount of braking torque provided by the friction braking system may be less than the difference between the desired braking torque and the maximum regenerative braking capacity of the electrical machine.

Traction torque may be applied with the engine when the desired braking torque is less than the desired traction torque.

The hybrid electric vehicle may include an engine, a brake control device, and an acceleration control device. The desired braking torque and desired traction torque may be based on actuation of the brake and the acceleration control devices, respectively. The method may include the step of turning off the engine if the brake control device and acceleration control device are not actuated or if the brake control device is actuated and the acceleration control device is not actuated. The engine may be turned on if the brake control device is not actuated and the acceleration control device is actuated or if the brake and acceleration control devices are both actuated.

DETAILED DESCRIPTION OF THE PREFERRED EMBODIMENT(S)

Figure 1:
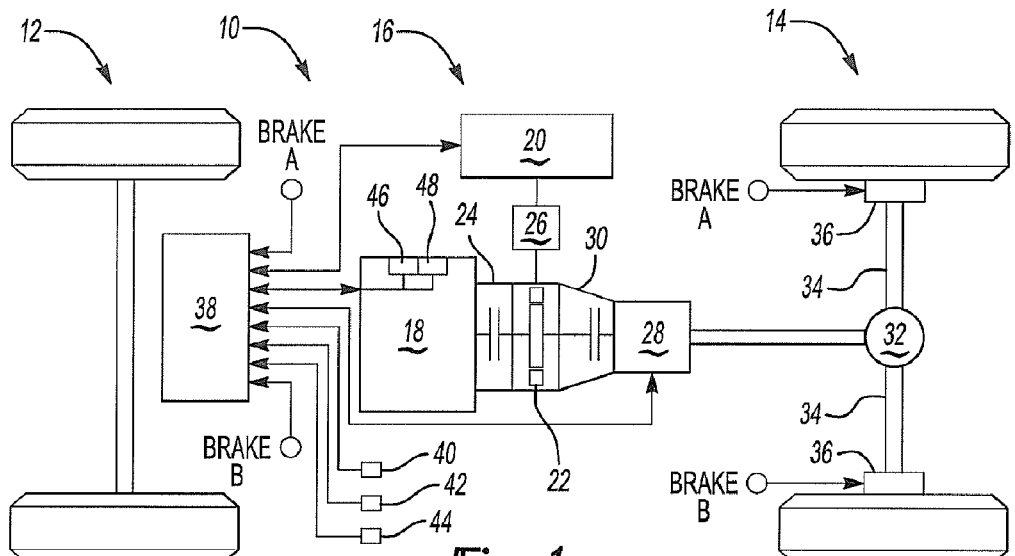
FIG. 1 is a schematic of a hybrid vehicle.

Referring to FIG. 1, a schematic of a hybrid electric vehicle 10 is shown. The hybrid electric vehicle 10 includes a first wheel set 12, a second wheel set 14, and a drivetrain 16.

The wheel drive system or drivetrain 16 may be configured to drive or provide torque to the first and/or second wheel sets 12,14. The drivetrain 16 may have any suitable configuration, such as a parallel drive, series drive, or split hybrid drive as is known by those skilled in the art. In the embodiment shown in FIG. 1, a parallel drive configuration is shown.

The hybrid electric vehicle 10 may also include a plurality of power sources. In the embodiment shown in FIG. 1, the hybrid electric vehicle 10 includes a primary power source 18 and a secondary power source 20. However, any suitable number of power sources may be employed.

The primary power source 18 may be any suitable energy generation device, such as an internal combustion engine.

The secondary power source 20 may be of any suitable type, such as a hydraulic power source or an electrical voltage source like a battery, capacitor, or fuel cell. If a battery is used it may be of any suitable type, such as nickel-metal hydride (Ni-MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art.

The primary and secondary power sources 18,20 are adapted to provide power to the drivetrain 16. The primary power source 18 may be selectively coupled to an electrical machine 22, such as a motor, motor-generator, or starter-alternator, via a first clutch 24. In the embodiment shown, the primary power source 18 may propel the hybrid electric vehicle 10 when the first clutch 24 is engaged. Similarly, the secondary power source 20 may power the electrical machine 22 to propel the hybrid electric vehicle 10 when the first clutch 24 is disengaged. In addition, both the primary and secondary power sources 18,20 may simultaneously provide power to the electrical machine 22.

An inverter 26 may be disposed between the secondary power source 20 and the electrical machine 22. The inverter 26 converts direct current (DC) to alternating current (AC) when current flows from the secondary power source 20 and converts alternating current (AC) to direct current (DC) when current flows to the secondary power source 20.

The electrical machine 22 may be selectively coupled to a power transfer unit 28 via a second clutch 30. The power transfer unit 28 may be of any suitable type, such as a multi-gear "step ratio" transmission or an electronic converterless transmission as is known by those skilled in the art.

The power transfer unit 28 is adapted to drive one or more vehicle wheels. For simplicity, a two-wheel drive system is shown, although the present invention contemplates other embodiments such as a four-wheel drive configuration. In the embodiment shown in FIG. 1, the power transfer unit 28 is connected to a differential 32 by a driveshaft. The differential 32 is connected to each wheel of the second wheel set 14 by a shaft 34, such as an axle or halfshaft.

The hybrid electric vehicle 10 may be configured with one or more energy recovery devices, such as a regenerative braking system that captures kinetic energy when the brakes are applied. This recovered energy may be returned to the secondary power source 20 via the electrical machine 22.

The hybrid vehicle 10 may also include a friction braking system 36. The friction braking system 36 may be configured as an electro-hydraulic braking (EHB) system or "brake by wire" system that applies braking torque to one or more vehicle wheels to inhibit wheel rotation. In addition, the friction braking system 36 may be an anti-lock brake system (ABS) that selectively actuates brakes associated with each wheel.

One or more controllers or control modules 38 may monitor and control various aspects of the hybrid electric vehicle 10. For example, the control module 38 may be connected to the primary power source 18, secondary power source 20, power transfer unit 28, clutches 24,30, and regenerative braking system 36 to monitor and control their operation and performance.

The control module 38 may also receive input signals from various components. For example, the control module 38 may communicate with an sensor 40 for detecting the position of an acceleration control device, such as an accelerator pedal, that provides a signal indicative of the presence of absence of a driver's acceleration commands, a sensor 42 for detecting the position of a brake control device, such as a brake pedal sensor, that provides a signal indicative of the presence or absence of driver's braking commands, a gear selector switch 44 that provides a signal indicative of a gear selected by a driver, a vehicle speed sensor 46 that provides a signal indicative of a speed or velocity (including the and direction of motion) of the vehicle 10, and one or more torque sensors 48 that provide a signal indicative of the level of output torque provided by the drivetrain 16. The speed and torque sensors 46,48 may be disposed in any suitable location or may be configured as virtual sensors that are based on other input signals associated with the drivetrain 16.

Referring to FIGS. 2-8, flowcharts depicting a method for controlling the hybrid vehicle are shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The method will be described primarily with reference to a situation in which a forward gear is selected and the vehicle is disposed on an inclined surface such that the vehicle is susceptible to rolling backwards, such as when a vehicle is pointed uphill. The present invention also contemplates alternative situations, such as those in which a reverse gear is selected and the vehicle is pointed downhill. The methodology for the forward gear/uphill orientation situation and reverse gear/downhill orientation situation use similar steps, but reverse the directions associated with traction and braking torque.

Figure 2:
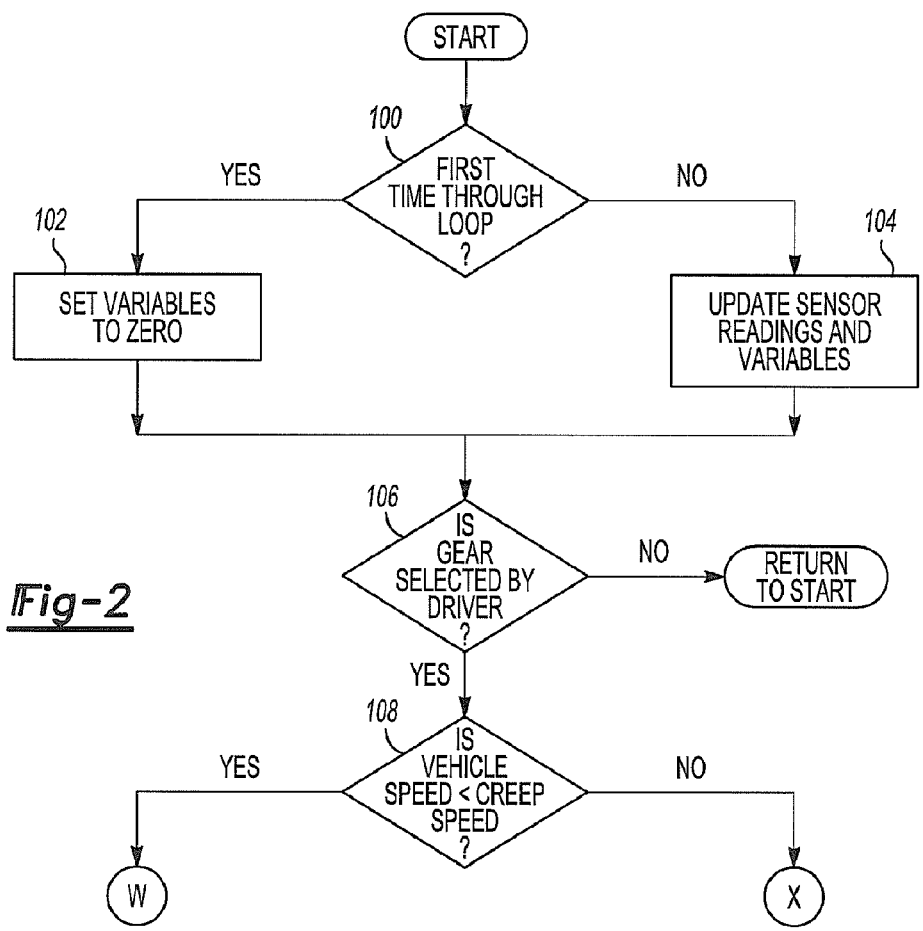
FIGS. 2-8 are flowcharts of a method for controlling a hybrid vehicle in accordance with the present invention.

Referring to FIG. 2, at 100, the method begins by determining whether the current iteration is the first iteration of the method. The current iteration may be measured from an initialization point, such as vehicle start-up or "key on". If the current iteration is the first iteration, then all variables are initially set equal to zero at block 102. If the current iteration is not the first iteration, then variable values and sensor readings are updated based on present conditions at block 104.

At 106, the method determines whether a gear has been selected by the driver. Gear selection may be based on the position of the gear selector detected by gear selector switch 44 as described above. For example, a gear may be selected when a forward ("drive") gear or reverse gear is selected by the driver. If a gear is not selected, then the method returns to the start (block 100). If a gear is selected, then the method continues at block 108.

At 108, the vehicle speed is compared to a creep speed value. The vehicle speed may be determined in any suitable manner, such as with a speed sensor as previously described. The creep speed value may be a predetermined threshold value and may be set at any suitable amount, such as 6 miles per hour (9.66 km/h). The creep speed may also be a variable. If the vehicle speed is less than the creep speed value, then the method continues on FIG. 3 as indicated by connector W. If the vehicle speed is not less than the creep speed value, then the method continues on FIG. 4 as indicated by connector X.

Figure 3:
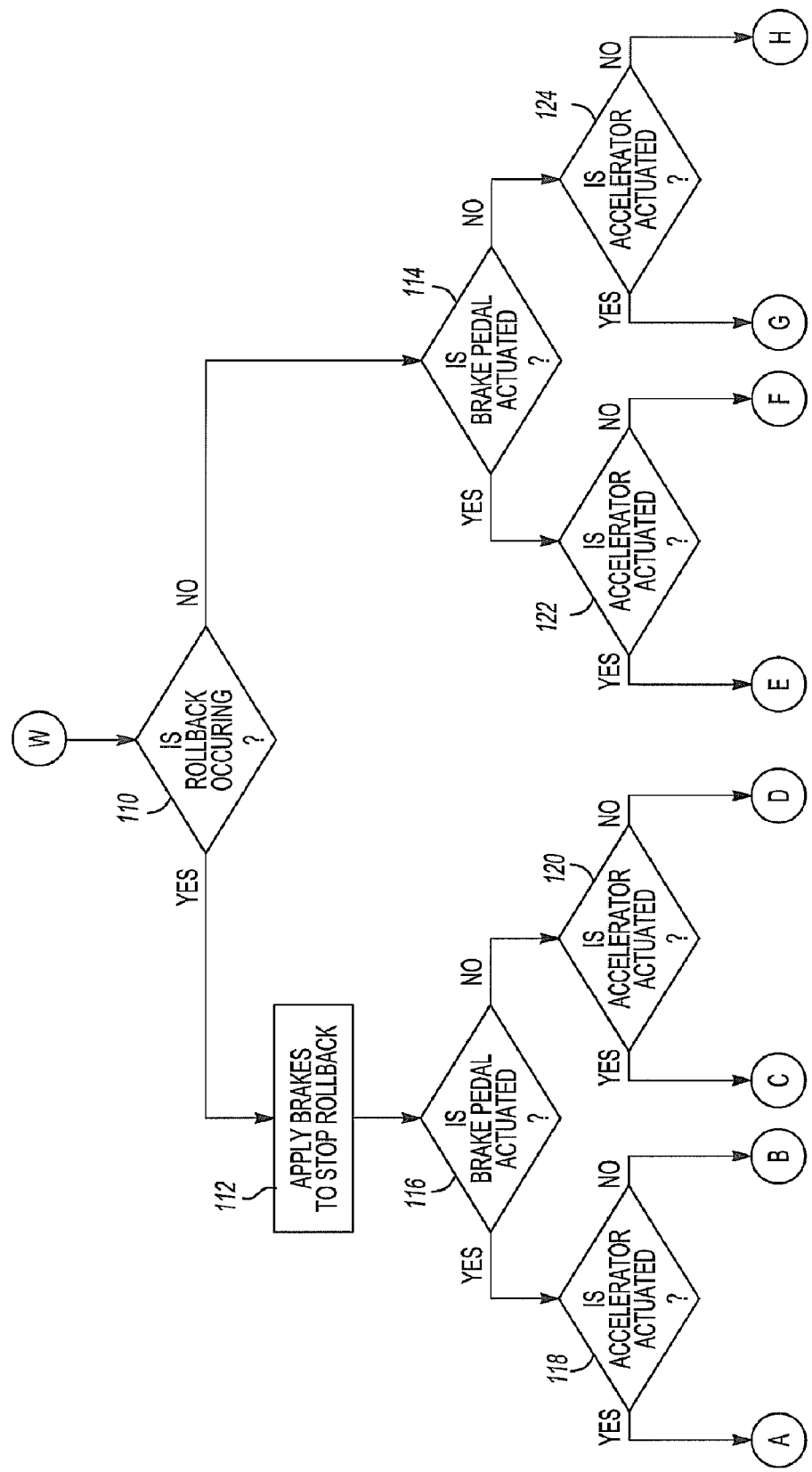

Referring to FIG. 3, at 110, the method determines whether a rollback condition exists. A rollback condition exists when the vehicle is moving in a direction opposite of that associated with a selected gear. For example, a rollback condition exists when a forward gear is selected and the vehicle is rolling backwards or when a reverse gear is selected and the vehicle is rolling forwards. A rollback condition is more likely to occur when the vehicle is disposed on an inclined surface and may be assessed by comparing a direction of motion of the vehicle with a direction associated with the selected gear. If a rollback condition exists, then the method continues at block 112. If a rollback condition does not exist, then the method continues at block 114.

At 112, the vehicle brakes are applied to inhibit rollback of the vehicle. For example, the brakes may be automatically actuated by a controller to apply a sufficient force or braking torque to inhibit rolling of the vehicle. Alternatively, a predetermined level of force, designated "grade hold torque" ($Torque_{Grade\_Hold}$) may be applied. The grade hold torque may be a predetermined level that is sufficient to inhibit vehicle rollback in most situations. For instance, the grade hold torque may be set at a level sufficient to hold the vehicle on a 3% grade, or the grade hold torque may be a variable level that will hold a vehicle on any grade. As such, the grade hold torque may be established by development testing and may be incorporated with configuring the controller. The method then continues at block 116.

At 116, the status of the brake control device is assessed. The status of the brake control device may be detected by the brake pedal sensor. In addition, the signal from the brake pedal sensor may be compared to a threshold brake pedal actuation value. If the signal from the brake pedal sensor exceeds the threshold brake pedal actuation value, then the brake control device is considered to be actuated and the method continues at block 118. If the signal from the brake pedal sensor does not exceed the threshold brake pedal actuation value, then the method continues at block 120.

At 118, the status of the acceleration control device is assessed. The status of the acceleration control device may be detected by the accelerator pedal sensor. In addition, the signal from the accelerator pedal sensor may be compared to a threshold accelerator pedal actuation value. If the signal from the accelerator pedal sensor exceeds the threshold accelerator pedal actuation value, then the accelerator pedal is considered to be actuated and the method continues at block A. If the signal from the accelerator pedal sensor does not exceed the threshold accelerator pedal actuation value, then the method continues at block B.

Block A is indicative of a "two footer" condition, since contradictory requests for acceleration and braking are being provided. For example, a two footer condition may exist when both the accelerator and brake control devices are being actuated. Actuation of the accelerator and brake control devices are indicative of contradictory requests for torque at the vehicle wheels. If the requested level of acceleration or "traction torque" (as indicated by actuation of the acceleration control device) exceeds the requested level of braking torque (as indicated by actuation of the brake control device), then the net effect is that vehicle acceleration is being requested. Similarly, if the level of traction torque requested does not exceed the level of braking torque requested, then the net effect is that braking of the vehicle is being requested.

Block B is indicative of a typical braking condition since only the brake control device is being actuated or a similar brake command is otherwise provided by the operator and/or appropriate controller.

At 120, the status of the acceleration control device is assessed in a manner similar to that described above with reference to block 118. If the signal from the accelerator pedal sensor exceeds the threshold accelerator pedal actuation value, then the accelerator is actuated and the method continues at block C. Block C is indicative of a request for acceleration since only the acceleration control device is actuated or a similar acceleration command is otherwise provided by the operator and/or appropriate controller. If the signal from the accelerator pedal sensor does not exceed the threshold accelerator pedal actuation value, then the method continues at block D. Block D is indicative of a stationary condition since the accelerator and brake control devices are not being actuated or acceleration and brake commands are not being provided by appropriate controllers.

Returning to block 114, the status of the brake control device is assessed in the same manner as block 116. If the brake control device is actuated, then the method continues at block 122. If the brake control device is not actuated, then the method continues at block 124.

At 122, the status of the acceleration control device is assessed in the same manner as block 118. If the acceleration control device is actuated, then the method continues at block E. Block E is similar to block A in that both blocks are indicative of a two footer condition since contradictory acceleration and braking requests exist. As such, acceleration is being requested if the level of traction torque requested exceeds the level of braking torque requested and vice versa. If the acceleration control device is not actuated, then the method continues at block F. Block F is indicative of a typical braking condition since only a braking command exists, such as when the brake control device is being actuated.

At 124, the status of the acceleration control device is assessed in the same manner as block 118. If the acceleration control device is actuated, then the method continues at block G. Block G is indicative of a request for acceleration since only an acceleration command exists, such as when the acceleration control device is actuated. If the acceleration control device is not actuated, then the method continues at block H. Block H is indicative of a stationary condition since acceleration and braking commands exist, such as when the accelerator and brake control devices are being actuated.

Figure 4:
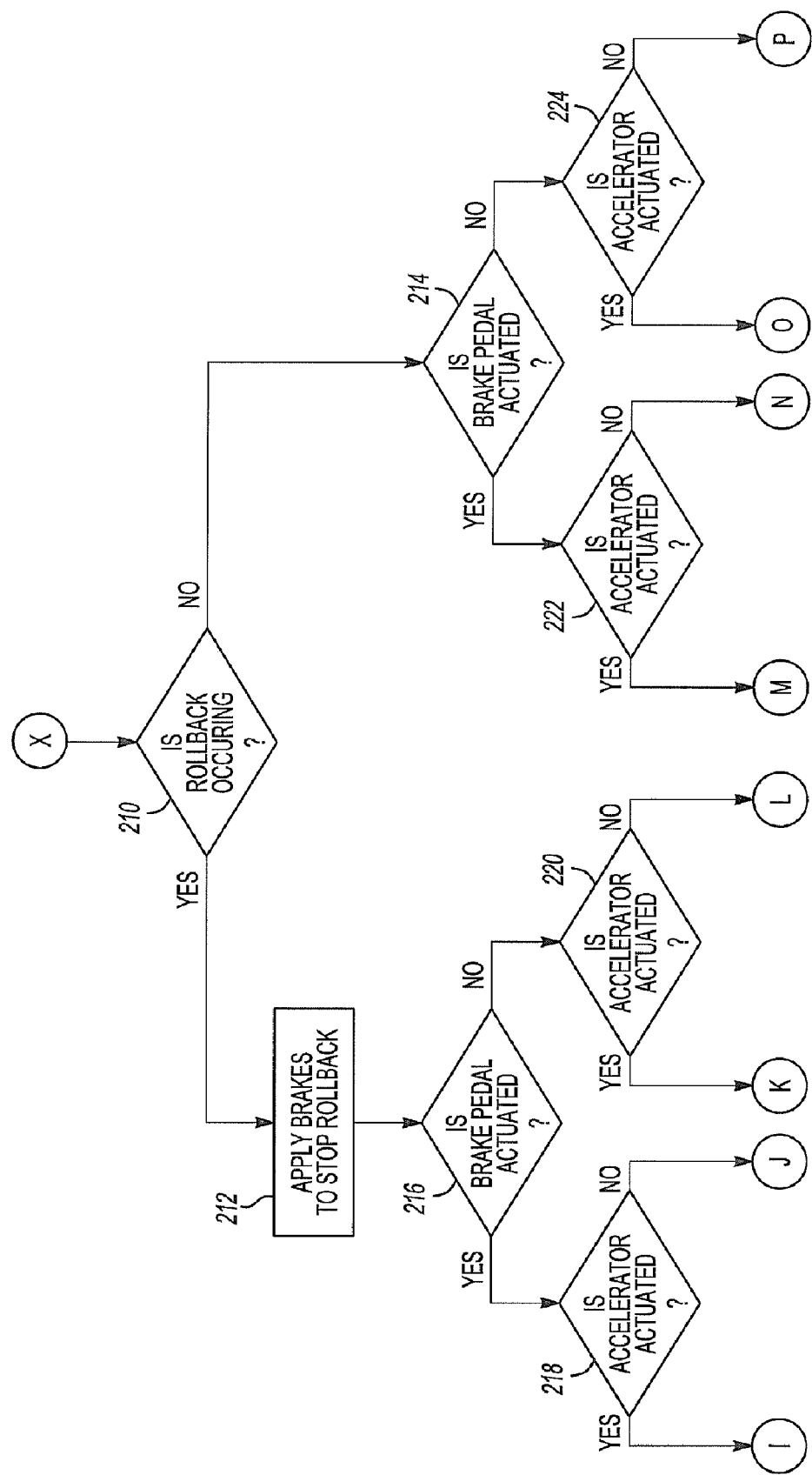

Referring to FIG. 4, a flowchart is shown for situations in which the vehicle speed exceeds the creep speed. It is unlikely that a rollback situation would occur when the vehicle speed is elevated (i.e., above the creep speed value). As such, this portion of the method is included for completeness and is unlikely to be executed in real-world driving conditions.

Blocks 210-224 in FIG. 4 correspond to blocks 110-124 in FIG. 3. However, blocks A-H are replaced with blocks I-P, respectively. In addition, Blocks I-F have similar attributes as the corresponding lettered block (A-H) in FIG. 3. For instance, blocks I and M represent "two footer" conditions (like blocks A and E), blocks J and N represent braking requests (like blocks B and F), blocks K and 0 represent acceleration requests (like blocks C and G), and blocks L and P represent stationary requests (like blocks D and H).

Figure 5:
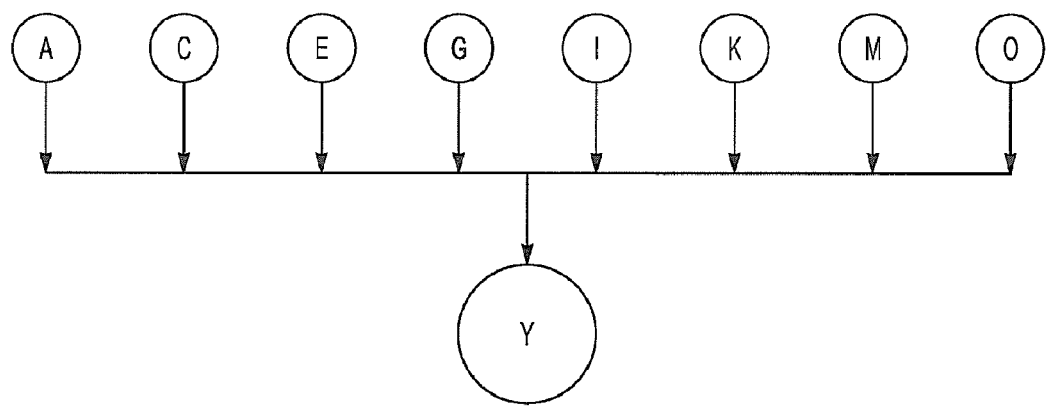
Figure 6:
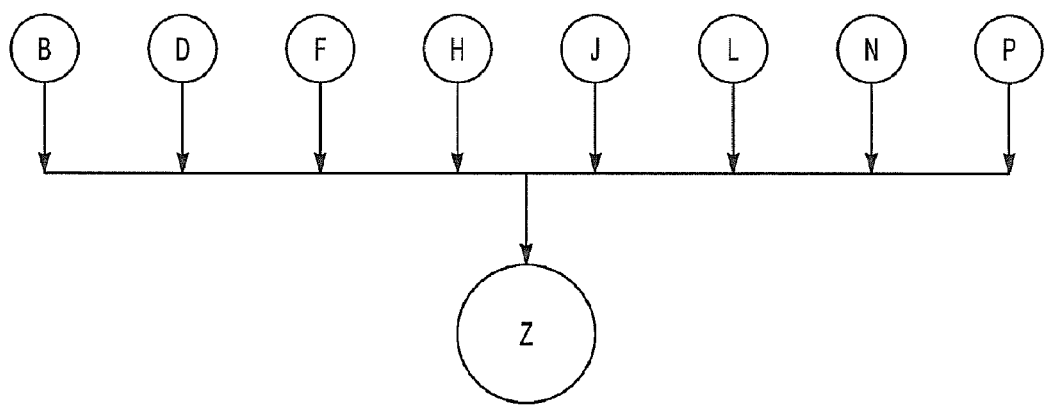

Referring to FIGS. 5 and 6, the connections between the lettered blocks (A-P) of FIGS. 3 and 4 and subsequent aspects of the method are shown. More particularly, blocks A, C, E, G, I, K, M, and O continue on FIG. 7 as indicated by connector Y in FIG. 5. Similarly, blocks B, D, F, H, J, L, N, and P continue on FIG. 8 as indicated by connector Z in FIG. 6.

Figure 7:
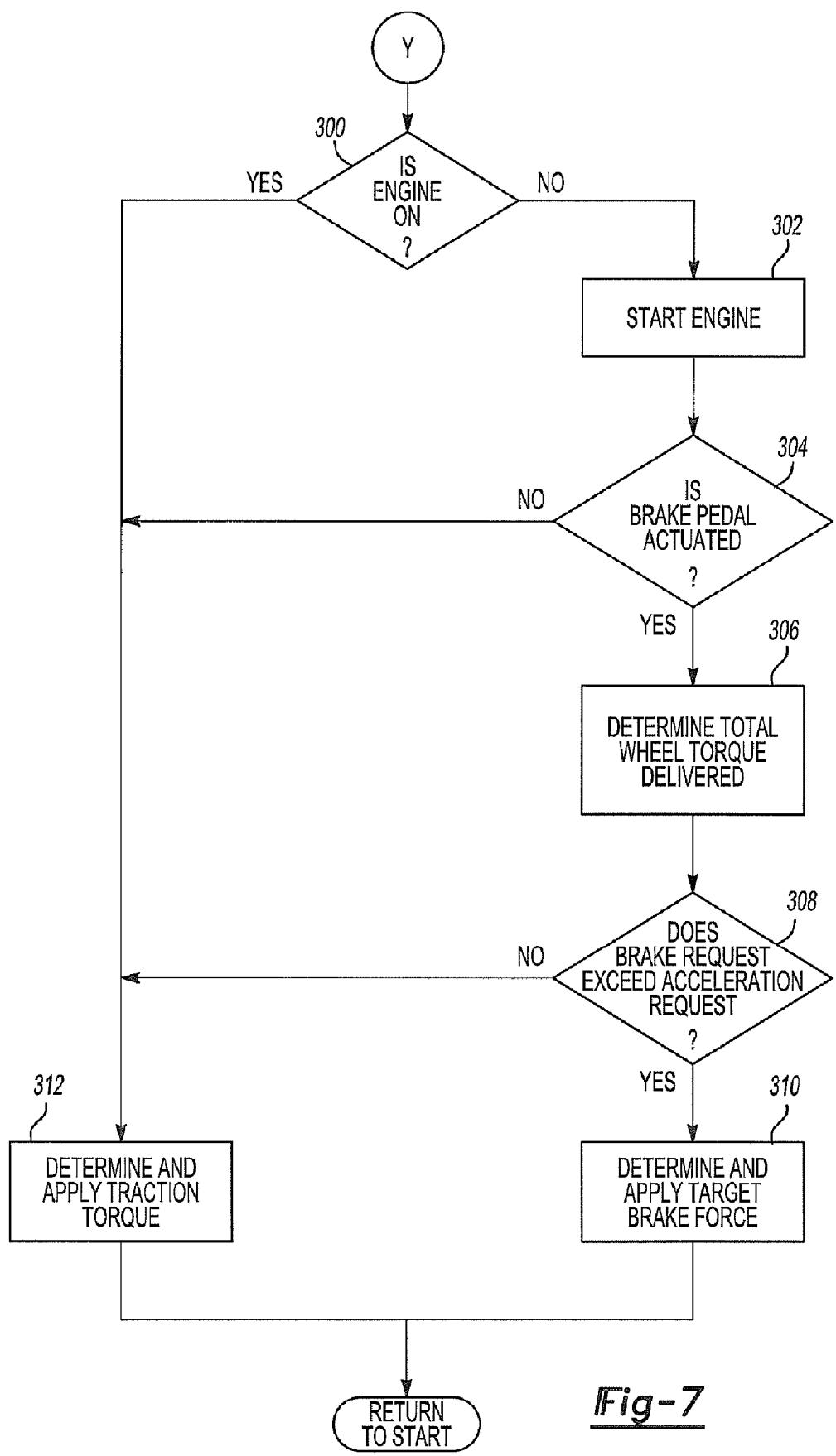

Referring to FIG. 7, the method steps associated with potential vehicle acceleration requests (A, E, I, M) and definitive vehicle acceleration requests (C, G, K, O) are shown.

At 300, the method determines whether the engine is "on" or running. If the engine is on, then the method continues at block 312. If the engine is not on, then the engine is started at block 302 before advancing to block 304.

At 304, actuation of the brake control device is assessed in the same manner as described above with reference to block 116. If the brake control device is not actuated, then a two footer condition does not exist (i.e., the driver wants to accelerate the vehicle) the method continues at block 312. If the brake control device is actuated, then a two footer condition exists and the method continues at block 306.

At 306, the total amount of torque to deliver to the vehicle wheels, designated $Torque_{Total}$, is determined. $Torque_{Total}$ may be based on the expression:

$$Torque_{Total} = Torque_{Traction} + Torque_{Brake} + Torque_{Grade\_Hold} \quad (1)$$

where:

$Torque_{Total}$ is the total torque to deliver to the vehicle wheels, $Torque_{Traction}$ is the desired level of traction torque indicated by the accelerator pedal position signal, $Torque_{Brake}$ is the desired level of braking torque indicated by the brake pedal position signal, and $Torque_{Grade\_Hold}$ is the grade hold torque if the grade hold torque is being applied (as in blocks A-D and I-L), otherwise this value is zero.

The desired traction torque ($Torque_{Traction}$) and desired brake torque ($Torque_{Brake}$) will partially cancel each other out. For instance, the traction torque may be indicated by a positive value while brake torque and/or grade hold torque may be indicated by negative values that algebraically reduce the total torque value.

At 308, a two footer condition exists and the contradictory requests for acceleration and braking are further assessed. More specifically, the levels of acceleration and braking torque requested by driver are compared to determine the driver's intent. If the requested level of braking torque (as indicated by actuation of the brake control device) is less than the requested level of traction torque (as indicated by actuation of the acceleration control device), then the net effect is that acceleration of the vehicle is being requested and the method continues at block 312. Similarly, if the level of braking torque requested exceeds the level of traction torque requested, then the net effect is that braking of the vehicle is being requested and the method continues at block 310.

At 310, a target level of braking torque is determined and applied. Braking torque may be provided by multiple sources. For example, the primary power source or engine may provide braking torque due to compression braking forces. More specifically, in the exemplary hybrid vehicle embodiment shown in FIG. 1, compression braking forces are exerted by the engine when the engine is not running and the first and second clutches 24,30 are at least partially engaged. The overall braking force exerted by the engine on the vehicle traction wheels, designated $Engine_{Brake\_overall}$, may be based on the expression:

$$Engine_{Brake\_Overall} = GR_{Power\_Transfer\_Unit} * Clutch_{Engagement\_Factor} * Engine_{Braking} \quad (2)$$

where:

$GR_{Power\_Transfer\_Unit}$ is the selected gear ratio of the power transfer unit, $Clutch_{Engagement\_Factor}$ is a clutch engagement factor, and $Engine_{Braking}$ is the braking force at the engine output shaft (e.g., crankshaft).

The clutch engagement factor ($Clutch_{Engagement\_Factor}$) is indicative of torque losses due to clutch slipping or incomplete clutch engagement. The clutch engagement factor may be determined for each clutch disposed between the engine crankshaft and the vehicle traction wheels. Clutch slipping may be determined or approximated in a manner known by those skilled in the art and may be based on various attributes including, but not limited to, clutch pressure, clutch temperature, clutch wear, engine speed, vehicle speed, gear ratio selected, and halfshaft resonance. For instance, clutch slipping increases when crankshaft and vehicle speeds are further apart, when clutch pressure is low, or when there is increased clutch wear.

The engine braking force ($Engine_{Braking}$) may be due primarily to compression braking forces. In addition, this parameter may also be affected by increased engine loads, such as load forces associated with front end accessory drive (FEAD) components like an air conditioning compressor.

In addition to the engine, braking torque may also be provided by the electro-hydraulic braking (EHB) system. The desired or target level of braking torque to provide with the electro-hydraulic braking system, designated $EHB_{Torque}$, may be based on the expression:

$$EHB_{Torque} = Brake\_Torque_{Desired} - Engine_{Brake\_overall} - Torque_{Grade\_Hold} \quad (3)$$

where:

$EHB_{Torque}$ is the desired amount of braking torque to provide,

Brake_Torque$_{Desired}$ is the braking torque desired by the driver (which may be based on the signal from the brake pedal sensor or in a two footer situation is based on the summation of the braking torque desired and the acceleration desired), Engine$_{Brake\_Overall}$ is the overall braking force exerted by the engine on the vehicle traction wheels (from expression 2 above), and Torque$_{Grade\_Hold}$ is the grade hold torque (if applied).

EHB$_{Torque}$ is indicative of the additional braking torque that is desired (net of braking forces already provided). This additional braking torque may be provided by the electro-hydraulic braking system and/or by the electrical machine. The present methodology uses the electrical machine and its regenerative braking features to provide braking torque (and to recover energy) as a default and uses the electro-hydraulic braking system to provide supplemental braking torque when needed.

The maximum regenerative braking capacity of the electrical machine, designated Regen_Capacity$_{Max}$, is limited. If the additional braking torque desired does not exceed the maximum regenerative braking capacity of the electrical machine (EHB$_{Torque}$≦Regen_Capacity$_{Max}$), then the braking torque (regenerative braking) is provided with the electrical machine. If the additional braking torque exceeds the maximum regenerative braking capacity of the electrical machine (EHB$_{Torque}$>Regen_Capacity$_{Max}$), then the maximum available braking torque is provided with the electrical machine and the remainder is provided with the electro-hydraulic braking system.

The magnitude of the braking torque provided by the regenerative braking system (i.e., electrical machine) is designated Regen_Torque$_{Desired}$ and may be based on the expression:

$$Regen\_Torque_{Desired} = EHB_{Torque} / (GR_{EM} * EM_{Engagement\_Factor}) \quad (4)$$

where:

EHB$_{Torque}$ is the desired amount of braking torque to provide,

GR$_{EM}$ is the gear ratio of the electrical machine, and

EM$_{Engagement\_Factor}$ is the electrical machine engagement factor.

The gear ratio of the electrical machine (GR$_{EM}$) may be a constant or may be based on a gear ratio of a continuously variable transmission or similar device coupled to the output of the electrical machine.

The engagement factor of the electrical machine (EM$_{Engagement\_Factor}$) may be based on various attributes including, but not limited to, the electrical machine operating temperature, its operating efficiency, as well as the clutch engagement factors previously described (if a clutch is disposed between the traction wheels and the electrical machine). After completing block 310, the method returns to the start (block 100).

At 312, the target amount of traction torque is determined and applied. The target amount of traction torque may be based on the acceleration request of the driver. For instance, the signal from the accelerator pedal sensor may be associated with traction torque values in a lookup table. In the case of a two footer condition, the traction torque provided is based on the total desired torque value (Torque$_{Total}$) discussed above. As a result, the amount of traction torque provided is not the total desired traction torque (based on the accelerator pedal input signal) but is net of the braking torque indicated by the brake pedal signal and grade hold torque effects. To apply the traction torque, the engine and/or motor output torque is increased to the desired level (accounting for the current gear ratio) and the clutches are engaged to permit traction torque to be delivered to the vehicle wheels. In addition, the braking torque may be reduced proportionally or at the same rate as the traction torque is increased to provide a smooth transition.

Figure 8:
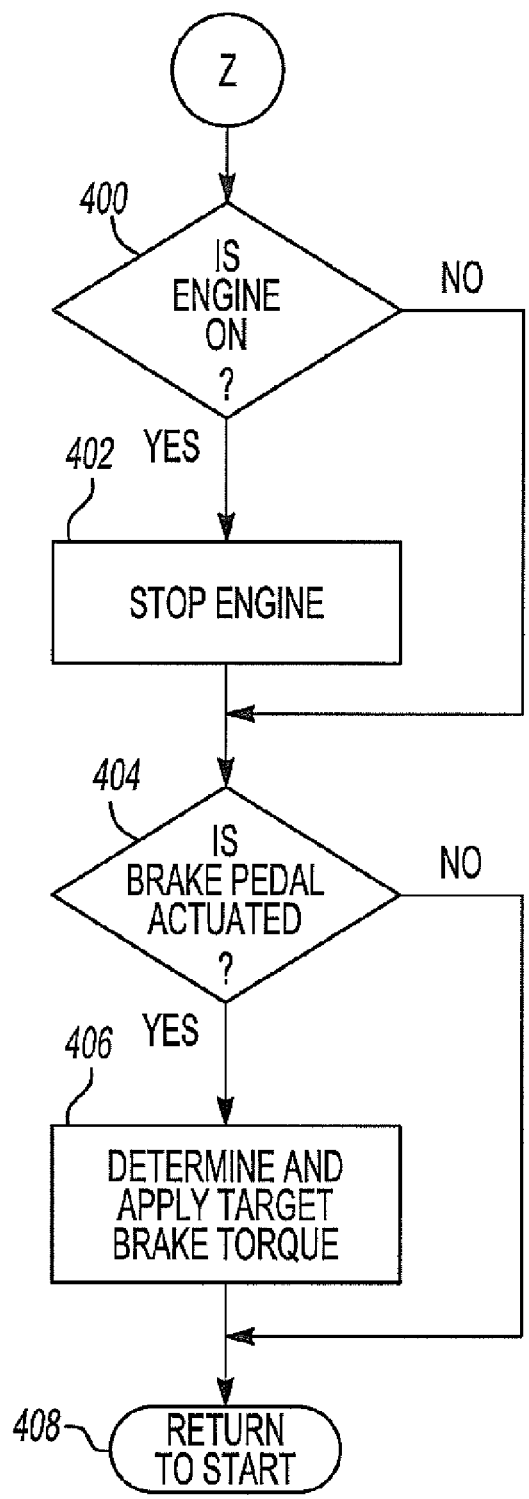

Referring to FIG. 8, the method steps associated with vehicle braking requests (B, F, J, N) and stationary or "hill holding" situations (D, H, L, P) are shown.

At 400, the method determines whether the engine is on, similar to block 300. If the engine is not on, the method continues at block 404. If the engine is on, then the engine is turned off or stopped at block 402 before continuing on to block 404.

At 404, actuation of the brake control device is assessed in a similar manner as described above with reference to block 304. If the brake control device is not actuated, then the method returns to the start (block 100) as indicated by block 408. If the brake control device is actuated, then the method continues at block 406.

At 406, the target level of braking force or brake torque is determined and applied in a similar manner as described above with reference to block 310.

While the best mode for carrying out the invention has been described in detail, those familiar with the art to which this invention relates will recognize various alternative designs and embodiments for practicing the invention as defined by the following claims.

What is claimed is:

1. A system for controlling drivetrain torque in a hybrid electric vehicle having primary and secondary power sources, the system comprising:
   a power transfer unit for driving a vehicle traction wheel;
   an electrical machine selectively coupled to the power transfer unit, the electrical machine being configured to provide traction torque to the traction wheel when powered by the primary or secondary power sources and impose a regenerative braking torque on the traction wheel when not powered by the primary or secondary power sources;
   an acceleration control device for providing a first signal indicative of a level of traction torque requested by a vehicle operator; and
   a brake control device for providing a second signal indicative of a level of braking torque requested by the vehicle operator;
   wherein regenerative braking torque is provided by the electrical machine when engagement of a gear of the power transfer unit is requested by the vehicle operator, the speed of the hybrid electric vehicle is less than a creep speed value, and the level of braking torque indicated by the second signal exceeds the level of traction torque indicated by the first signal.

2. The system of claim 1 wherein the hybrid electric vehicle further comprises a friction braking system for inhibiting rotation of the traction wheel and wherein the regenerative braking torque is supplemented by the friction braking system when the braking torque requested by the vehicle operator exceeds a maximum regenerative braking capacity of the electrical machine.

3. The system of claim 1 wherein the primary power source is an internal combustion engine.

4. The system of claim 3 wherein the internal combustion engine is turned off when engagement of a gear of the power transfer unit is requested by the vehicle operator, the speed of the hybrid electric vehicle is less than the creep speed value, and the accelerator and brake control devices are not actuated.

5. The system of claim 1 wherein the friction braking system is actuated to inhibit rollback of the hybrid electric vehicle when the vehicle operator requests engagement of a gear of the power transfer unit, the speed of the hybrid electric vehicle is less than the creep speed value, and the traction wheel is rotating in a first direction that is opposite a direction associated with the gear requested by the vehicle operator.

6. A method of controlling torque in a hybrid electric vehicle drivetrain having an engine and an electrical machine for driving a vehicle wheel, the method comprising:
   actuating a friction brake system to inhibit rollback when a vehicle rollback condition exists; and
   providing a regenerative braking torque with the electrical machine when a desired braking torque exceeds a desired traction torque and turning off the engine when a brake control device is actuated and an acceleration control device is not actuated.

7. The method of claim 6 wherein the engine is turned off if accelerator and brake control devices are not actuated.

8. The method of claim 6 wherein the friction brake system is actuated before providing regenerative braking torque.

9. The method of claim 6 wherein the regenerative braking torque is supplemented with braking torque provided by the friction braking system when the desired braking torque exceeds a maximum regenerative braking capacity of the electrical machine.

10. A method of controlling torque in a drivetrain of a hybrid electric vehicle, the method comprising:
    actuating a friction braking system to inhibit rollback when speed of the hybrid electric vehicle is less than a creep speed value and a gear is selected; and
    providing a braking torque with an electrical machine to capture energy when a desired braking torque exceeds a desired traction torque.

11. The method of claim 10 wherein the desired braking torque is based on actuation of a brake control device.

12. The method of claim 10 wherein the desired traction torque is based on actuation of an acceleration control device.

13. The method of claim 10 wherein the method further comprises providing braking torque with the friction braking system when the desired braking torque exceeds a maximum regenerative braking capacity of the electrical machine.

14. The method of claim 13 wherein the maximum regenerative braking capacity is based on a gear ratio of the electrical machine and an electrical machine engagement factor.

15. The method of claim 13 wherein the amount of braking torque provided by the friction braking system is not greater than the difference between the desired braking torque and the maximum regenerative braking capacity of the electrical machine.

16. The method of claim 10 wherein the drivetrain includes an engine and the method further comprises the step of applying traction torque with the engine when the desired braking torque is less than the desired traction torque.

17. The method of claim 10 wherein the hybrid electric vehicle includes an engine, a brake control device, and an acceleration control device, wherein the desired braking torque and desired traction torque are based on actuation of the brake and acceleration control devices, respectively, and wherein the method further comprises the step of turning off the engine if the brake control device and acceleration control device are not actuated.

18. The method of claim 17 wherein the engine is turned off if the brake control device is actuated and the acceleration control device is not actuated.

19. The method of claim 17 further comprising the step of running the engine if the brake control device is not actuated and the acceleration control device is actuated.

20. The method of claim 17 further comprising the step of running the engine if the brake control device and the acceleration control device are actuated and the desired traction torque exceeds the desired braking torque.

* * * * *